May 13, 1947. J. O'DONNELL 2,420,326
SEWAGE DISPOSAL
Filed March 20, 1942

INVENTOR
JAMES O'DONNELL
by Luther L. Mack
ATTORNEY

Patented May 13, 1947

2,420,326

UNITED STATES PATENT OFFICE 2,420,326

SEWAGE DISPOSAL

James O'Donnell, Los Angeles, Calif.

Application March 20, 1942, Serial No. 435,582

11 Claims. (Cl. 210—6)

My invention comprehends the provision of a suitable sewage disposal unit, either above or below the ground, and arranged for connection with drain pipes leading from a building and adapted to be interposed between an outlet, or outlets from a building and a point of disposition, whereby the products and components of drainage systems may be treated for the purpose of dissolution and separation prior to the delivery thereof to desired points, especially where sewers are not available.

In a more limited and detailed sense my invention is designed for collecting solids and semi-solids, as well as the accompanying liquids and separating the solids which are soluble from the insoluble elements, draining off the insoluble elements at one point and draining off the soluble elements and liquid at a different point, and treating the solid and liquid elements of the waste material during its transit through my improved unit for the purpose of effecting decomposition, dissolution and disintegration thereof.

A further object is to provide a septic disposal unit adapted to contain above the maximum level of the accumulated waste material in a suitable tank a substantial volume of gas, such as chlorine, carbon dioxide or other types of gas usually prevalent in such systems, which either separately or together tend to effect fermentation or dissolution of certain ingredients of the matter subjected to the presence of the gas of whatever character it might be.

An object, also, is to provide means for preventing the back-flow of gas from the septic tank through the drain connections of a building.

A still further object is to provide a septic unit embodying a tank within which a shallow receptacle is mounted movably for initially receiving the products of a drainage system, and which is arranged to hold the undissolved ingredients independently of the liquid ingredients and to both discharge the liquid contents into the tank proper and to receive, at times, liquid ingredients from the tank, during the treatment of the waste material prior to its discharge to a point of disposition.

Another object is to provide a siphonic discharge of the treated matter from the tank whenever the level of the matter attains a predetermined point, so as to thereby limit the level of the accumulated matter in the tank.

Other objects include the provision of suitable means for movably supporting the collection receptacle in the tank; means for manually opening the tank at necessary intervals for draining off the insoluble and undecomposed ingredients. Still other objects may appear as the description of my apparatus progresses.

I have shown a preferred type of sewage disposal unit in the accompanying drawing, embodying my invention, subject, however, to modification, within the scope of the appended claims, without departing from the spirit of the invention. In said drawing:

Figure 1:
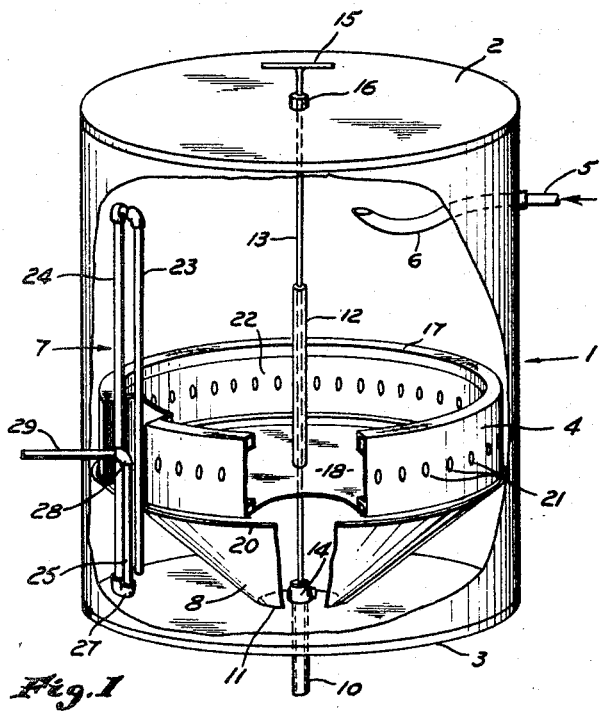
Fig. 1 is a perspective view of the assembled unit, partly broken away to show the interior thereof.
Figure 6:
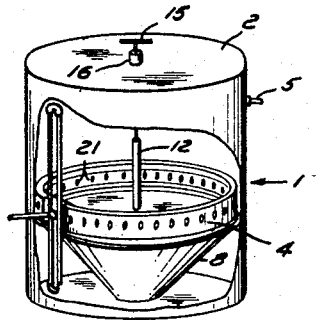
Figures 2, 7:
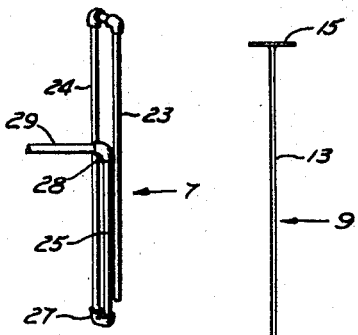
Fig. 2 is a detached view, in elevation, of an operating means for manually opening and closing a valve in the bottom of the sewage tank to permit the draining off of undissolved ingredients of the sewage.
Figure 4:
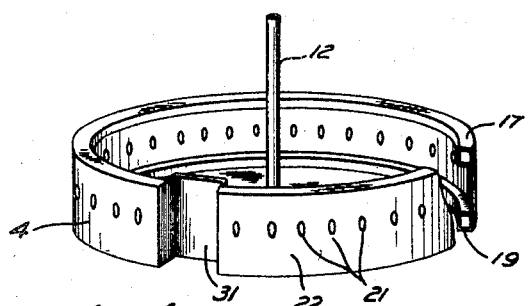
Fig. 4 is a perspective view of the collection receptacle detached from the tank.
Figure 3:
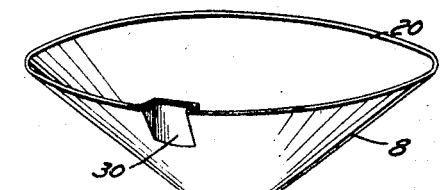
Fig. 3 is a perspective view of a funnel employed in the tank and having a dual function of supporting the collection receptacle and for directing certain elements to a drain at the bottom of the tank.
Figure 5:
Fig. 5 is a view of the gas trap adapted to be interposed between a drainage system and the inlet to the septic tank.

Fig. 6 is a view, similar to Fig. 1 but on a smaller scale and indicating the usefulness of the structure of Fig. 1 as a grease trap, whereby the grease from the drained material may be removed prior to the entry thereof into the main unit; and Fig. 7 is a detached view, in elevation, of a suitable siphon through which the treated matter is drawn off for delivery to a point of ultimate disposition.

Briefly, my improved apparatus includes a septic tank 1 having a top 2 in sealed contact with tank 1 and bottom 3, within which is movably mounted a collection receptacle 4 of shallow cross section for receiving both liquid and solid components of the sewage, an inlet pipe 5 adapted for connection with a source of drainage, a gas trap 6 attached to pipe 5 and mounted within tank 1 so as to be at all times disposed over the receptacle 4, a siphonic discharge unit 7 mounted on and adjacent to the wall of the tank 1, a funnel 8 at the bottom of tank 1 and below the receptacle 4, and a manually operable means generally indicated at 9 for regulating the evacuation of certain undissolved solids from the tank 1.

The bottom 3 of tank 1 has a drain pipe 10 leading therefrom, over the tank inlet to which I position the outlet 11 of funnel 8. The top of said funnel is open, as shown, and either just within or above the top of said funnel the receptacle is mounted so as to rest just within the top of the funnel only when it is in its lowermost position.

Receptacle 4 has a central tube 12 of substantial length attached thereto with its upper end positioned so as to engage the top 2 of tank 1 and thereby limit the upward movement of receptacle 4 when the same is movably mounted. Tube 12 telescopes a rod 13 which forms a part of the drain operating means 9, so that receptacle 4, when movable, is guided in its upward and downward movement on rod 13. The lower end of rod 13 carries a valve 14 (Fig. 2) or is suitably attached thereto, which is effective for closing the inlet to drain pipe 10. The upper end of rod 13 (above top 2 of tank 1) is provided with a hand grip 15. Said rod is suitably packed in tank top 2 by a packing gland 16 affixed to the tank, so as to prevent leakage of fluids from the tank around the rod.

Receptacle 4, when movably supported as shown and preferred, has a buoyant rim 17 at its upper edge which is adapted to be filled with air, cork or other buoyant material, or such material may be attached thereto. The requisite buoyancy is influenced by the weight of the receptacle and its contents but is designed to be of such effect as to always cause the loaded receptacle to float on the liquid contained in the tank 1 therebelow or at times to be partially submerged in the liquid when the weight of its solid contents may cause its submergence to the level of perforations 21. The bottom 18 of the receptacle may have a rim or additional buoyant head 19 adapted to fit within the top edge 20 of funnel 8 when the receptacle is at rest thereupon. The perforations 21 are formed in the wall 22 of the receptacle on a common horizontal line, preferably, for discharging the liquid contents of the receptacle into the tank 1, and at times, also, as hereinabove explained, admitting liquid from the tank into the receptacle.

Adjacent the wall of tank 1 I provide the discharge siphon 7 embodying three vertical lengths of pipe 23, 24 and 25. Pipes 23 and 24 are connected at their upper extremities by an elbow 26; pipes 24 and 25 are similarly connected at their lower extremities by an elbow 27, and pipe 25 is connected with a lead-out pipe 29 by means of a fitting 28. Pipe 23 is open at its lower end to the liquid of tank 1 and the height of pipes 23 and 24 corresponds to the maximum permitted level of liquid in tank 1. Thus, when the liquid in the tank attains a level but slightly above fitting 26 the liquid will be siphonically discharged downwardly through pipe 24 and thence upwardly through pipe 25 and outwardly to an ultimate point of disposition through pipe 29.

Both the funnel 8 and receptacle 4 are recessed at 30 and 31, respectively, for affording clearance for the siphon 7 whereby insertion of the funnel and receptacle is facilitated and permitted, and when a movable receptacle is employed it will be free to ascend and descend in the tank during the operation of the unit.

Now, in operation, assuming that tank 1 is empty upon its initiation into use, the receptacle 4 will normally rest just within the top of or but slightly above the top of funnel 8.

If the receptacle 4 is movably mounted, as shown herein, or in any event, the drained material will enter the tank through the goose-neck inlet 5 and will be collected in receptacle 4. When the material in the receptacle attains the level of the perforations 21 the liquid contents will discharge into and continue to fill the tank 1 below the receptacle. As the liquid level in the tank rises the pan-like receptacle will tend to float on the surface of the liquid and rise with it until the accumulated weight and mass of material in the receptacle causes a submergence of the receptacle in the liquid to a point at or above the perforations 21. Should the receptacle sink in the liquid of the tank to the level of the buoyant rim thereof the receptacle will still float due to the precomputation and determination of the relative weight and buoyancy of the receptacle.

When however the liquid in the tank and the receptacle 4 have attained a maximum level at or above the tops of the siphon pipes 23 and 24 the liquid will flow out of the tank through the siphon and the receptacle will be correspondingly lowered in the tank again. That portion of the tank above receptacle 4 and the top 2 will gradually be filled with decomposing gases caused by putrefaction and fermentation which attack the sewage in the receptacle and cause its rapid dissolution and disintegration to a state where the originally solid or semi-solid elements will flow off through the siphon 7 with the liquid. It is apparent that if necessary in some cases certain chemicals may be delivered through inlet 5 to the interior of the tank 1 for expediting the dissolution of the sewage.

At usually infrequent intervals the tank draining unit 9 may be manually operated for assuring the discharge from the tank of all accumulated undissolved particles of sediment formed by the collection of small particles of solid matter which may have been carried out through the openings 21 in the wall of receptacle 4 and been carried downwardly over the wall thereof and caught by the upper edge of funnel 8. Small particles caught by the upper edge of funnel 8 will slide downwardly into the funnel, whenever the receptacle is floated out of contact therewith, and will be collected in the bottom of the funnel 8, from which it may be discharged by opening of valve 14, to drain pipe 10.

Having described my invention, what I claim as new and desire to secure by Letters Patent is:

1. A sewage disposal apparatus comprising: a septic tank having an inlet and a siphonic outlet lower than said inlet, a vertically movable buoyant receptacle having an imperforate bottom and sides having perforations therein above the bottom for receiving the admitted sewage, a buoyant rim on said receptacle at the top thereof precalculated to keep said receptacle afloat notwithstanding the accumulated waste thereon and the force of the incoming sewage.

2. A sewage disposal apparatus comprising: a septic tank having an inlet and a siphonic outlet lower than said inlet, and a buoyant collector receptacle between the inlet and outlet for the admitted sewage movably mounted in said tank for receiving the liquid and formed with imperforate and perforated portions for separating the liquid and solid ingredients at a level intermediate the inlet and outlet, and means for preventing the back flow of gas through said inlet.

3. A sewage disposal apparatus comprising: a septic tank having an inlet and a siphonic outlet lower than said inlet, and a collector receptacle between the inlet and outlet for the admitted sewage mounted in said tank for receiving and separating the liquid and solid ingredients at a level intermediate the inlet and outlet, said receptacle having a buoyant rim and a closed bottom and also a perforated wall with the perforations in the approximate mid portion of the receptacle, whereby under certain conditions the receptacle will float on the surface of the liquid in the tank for holding the solid matter on the surface of the liquid matter and under other conditions while submerged at least to the plane of its buoyant rim and while loaded to a maximum extent will remain natantly in the liquid of the tank, and thus retain the solid matter against deposition in the liquid.

4. A sewage disposal apparatus comprising: a septic tank having an inlet near the top thereof for admitting liquid and solid matter, a siphonic outlet open at a point near the bottom of the tank, and a sediment drain at the bottom of the tank for, respectively, evacuating the liquid and solid contents of the tank, a buoyant collector receptacle between the inlet and outlet openings and having an imperforate bottom and a side wall and vertically movable in said tank for receiving the liquid and solid matter and for holding the solid matter at all times against deposition in the liquid and having a plurality of peripheral outlets in the side wall above the bottom for the liquid matter, said receptacle being adapted to float on the liquid in the tank and being removable to dispose of any undissolved residue therein, said sediment drain being operable to remove all other sediment in said tank.

5. A sewage disposal apparatus of the character described in claim 4 including an annular buoyant rim on the collector receptacle of such proportion and size as will afford additional buoyancy to and prevent the complete submergence of the receptacle.

6. A sewage disposal apparatus of the character described in claim 4 including a funnel shaped member under the collector receptacle having the reduced funnel outlet registrable with said sediment drain, whereby the solid contents which has disintegrated by chemical action may be discharged from the receptacle into the sediment drain.

7. A sewage disposal apparatus of the character described in claim 4 including a valve interposed between said collector receptacle and said sediment drain for regulating the discharge of matter from the tank to the drain, and means extended through the receptacle to a point external of the tank for operating the valve.

8. A sewage disposal apparatus of the character described in claim 4 including means for limiting the upward movement of the collector receptacle.

9. A sewage disposal apparatus of the character described in claim 4 in which the inlet to the tank is above the highest level of the collector receptacle and the liquid outlet is positioned at a level below the lowest possible level of the liquid outlets affording communication between the tank and the collector receptacle, so as to prevent the draining of solid constituents of the sewage through the liquid outlet of the tank.

10. A sewage disposal apparatus comprising: a septic tank having an inlet at the top and a siphonic outlet lower than said inlet, a vertically movable buoyant receptacle between the inlet and outlet having an imperforate bottom and perforations in the periphery thereof in the approximate mid portion of the receptacle and being movably disposed below said inlet, a funnel means coaxially disposed beneath said receptacle, a drain valve at the bottom of said tank, and manual control means for said valve extending axially through said tank and through the top thereof so as to provide a flushing means for an insoluble residue precipitated in said funnel, and the said receptacle being so disposed relative to said inlet as to receive the solid waste for separating and retaining the same at the surface in said tank until decomposed and carried into solution by the inlet flow, said receptacle being removable from said tank for convenient disposal of an insoluble residue therein.

11. In a sewage disposal apparatus, a tank, an opening through the bottom thereof, a manually regulated closure for said opening, means for operating the closure from above the tank, an outlet for the tank, a sewage inlet for the tank positioned at a point above said outlet, means for preventing the escape of gases generated in the tank due to the disintegration of the solid matter, said apparatus including a buoyant receptacle between the inlet and outlet in the tank having an imperforate bottom and a peripheral wall about the bottom having perforations in its approximate mid portion together with means arranged to permit the extension through said bottom of said closure operating means.

JAMES O'DONNELL.

REFERENCES CITED

The following references are of record in the file of this patent:

UNITED STATES PATENTS

| Number | Name | Date |
| --- | --- | --- |
| 1,102,674 | Lawrence | July 7, 1914 |
| 1,120,351 | Weston | Dec. 8, 1914 |
| 1,148,500 | Caverno | Aug. 3, 1915 |
| 2,078,260 | Mallory | Apr. 27, 1937 |
| 1,644,532 | Ledyard et al. | Oct. 4, 1927 |
| 1,649,028 | Gutman | Nov. 15, 1927 |
| 2,068,140 | Jaquith | Jan. 19, 1937 |
| 2,226,968 | Clerici | Dec. 31, 1940 |
| 617,057 | Sieben | Jan. 3, 1899 |
| 630,958 | Wilson | Aug. 15, 1899 |
| 1,312,041 | Morison | Aug. 5, 1919 |
| 869,001 | Lucas | Oct. 22, 1907 |
| 1,179,327 | Kearney | Apr. 11, 1916 |
| 1,641,469 | Baker | Sept. 6, 1927 |
| 306,981 | Whiting | Oct. 21, 1884 |
| 1,675,860 | Neumann | July 3, 1928 |
| 1,115,857 | Nabstedt | Nov. 3, 1914 |
| 1,332,882 | Boze | Mar. 9, 1920 |
| 1,343,764 | Clifford | June 15, 1920 |

FOREIGN PATENTS

| Number | Country | Date |
| --- | --- | --- |
| 113,306 | Switzerland | Jan. 2, 1926 |
| 113,339 | Austria | May 25, 1929 |